No. 756,206. PATENTED APR. 5, 1904.
W. H. BENDER.
ADVERTISING NOVELTY.
APPLICATION FILED AUG. 11, 1903.
NO MODEL. 6 SHEETS—SHEET 4.

WITNESSES:

INVENTOR
William Howard Bender
BY
ATTORNEY

No. 756,206. PATENTED APR. 5, 1904.
W. H. BENDER.
ADVERTISING NOVELTY.
APPLICATION FILED AUG. 11, 1903.
NO MODEL. 6 SHEETS—SHEET 5.

WITNESSES: INVENTOR
Gustav Dieterich. William Howard Bender
Edwin N. Dieterich. BY Chas. C. Gill
ATTORNEY No. 756,206. Patented April 5, 1904.

UNITED STATES PATENT OFFICE.

WILLIAM HOWARD BENDER, OF BROOKLYN, NEW YORK.

ADVERTISING NOVELTY.

SPECIFICATION forming part of Letters Patent No. 756,206, dated April 5, 1904.

Application filed August 11, 1903. Serial No. 169,094. (No model.)

*To all whom it may concern:*

Be it known that I, WILLIAM HOWARD BENDER, a citizen of the United States, and a resident of Brooklyn, in the county of Kings and State of New York, have invented certain new and useful Improvements in Advertising Novelties, of which the following is a specification.

The invention relates to improvements in advertising novelties; and it consists in the novel features and combinations of parts hereinafter described, and particularly pointed out in the claims.

The object of the invention is to produce a machine or apparatus for the attractive display of advertising or other matter and comprising in its preferred embodiment a general supporting-frame, a group of individual rollers carrying flexible curtains wound thereon at the upper end of said frame, a like group of individual rollers with curtains wound thereon at the lower end of said frame, movable carriers supporting said rollers at the opposite ends of said frame, a traveler adapted to be moved as rapidly or slowly or continuously or intermittently as may be desired intermediate said groups of rolled curtains, clutches carried by said traveler for engaging when the traveler is at the lower end of its path one of the curtains of the lower group and unrolling the same upwardly (for displaying the matter thereon) as the traveler moves to the upper end of its path, additional clutches carried by said traveler for engaging when the traveler reaches its upper position one of the curtains of the upper group and unrolling the same downwardly (for displaying the matter thereon) as the traveler returns to its lower position to allow the curtain previously unrolled upwardly to become rewound and delivered to the lower roller-carrier, and means connected with said traveler for actuating the respective roller-carriers when said traveler approaches the same and delivers a rewound already-displayed curtain thereto to move the next curtain to be displayed to the clutches of the traveler, so that the same may be unrolled upon the succeeding movement of said traveler. Every time the traveler reaches the lower end of its path it releases an already-displayed curtain of the lower group and engages the next curtain of the said group to be displayed by being unrolled upwardly, and every time the traveler reaches its upper position it releases an already-displayed curtain of the upper group and engages the next curtain of the said group to be displayed by being unrolled downwardly, and thus the traveler while in motion in either direction is constantly unrolling one curtain for the display of the matter thereon and allowing the last previously-displayed curtain to rewind upon its roller.

In accordance with my invention I am enabled to employ a number of curtains at the respective ends of the apparatus and to display these curtains in succession, there being no period during the employment of the apparatus when its entire front field is not covered by either portions of an unrolling curtain and a receding curtain or by a completely-unrolled curtain. My purpose is to allow the traveler to remain at rest a due length of time when it reaches the ends of its path, so that the matter on an individual curtain may remain displayed a proper period and occupy the entire front field of the apparatus.

An essential and predominating feature of my invention is that the traveler carries the rolled curtains and effects the unrolling of the same by its movement as distinguished from engaging the outer end of the curtain and pulling it either upwardly or downwardly, and this is a very important feature in its effect upon the observer and in respect of the efficiency and desirability of the apparatus, because with my invention there is no movement of the unrolled portion of the curtain, (such as would be the case, for illustration, in pulling down the commonly-used window-curtain,) and the matter to be displayed gradually grows into view and remains stationary during the movement of the carrier to unroll the curtain, an efficient display being thereby made and an attractive effect produced. During the rolling up of the curtain the observer does not see any movement in the curtain itself; but the displayed matter gradually disappears, and the gradual appearing and disappearing of the displayed matter without apparent movement of the curtain is an important feature in the operation of the apparatus constituting my invention.

The invention and satisfactory means for carrying the same into effect will be fully understood from the detailed description hereinafter presented, reference being had to the accompanying drawings, in which—

The general supporting-frame of the apparatus comprises a top plate 20, a base-plate 21, two right-hand standards 22 22, two corresponding left-hand standards 23 23, a rear central guide-rod 24, cross-bars 25, connecting at their upper portions the standards 22 22 and the standards 23 23, and cross-bars 26 26, connecting at their lower ends the standards 22 22 and the standards 23 23, the said standards 22 23 and guide-rod 24 being secured at their upper and lower ends to the top plate 20 and base-plate 21, respectively.

Figures 3, 4, 5:
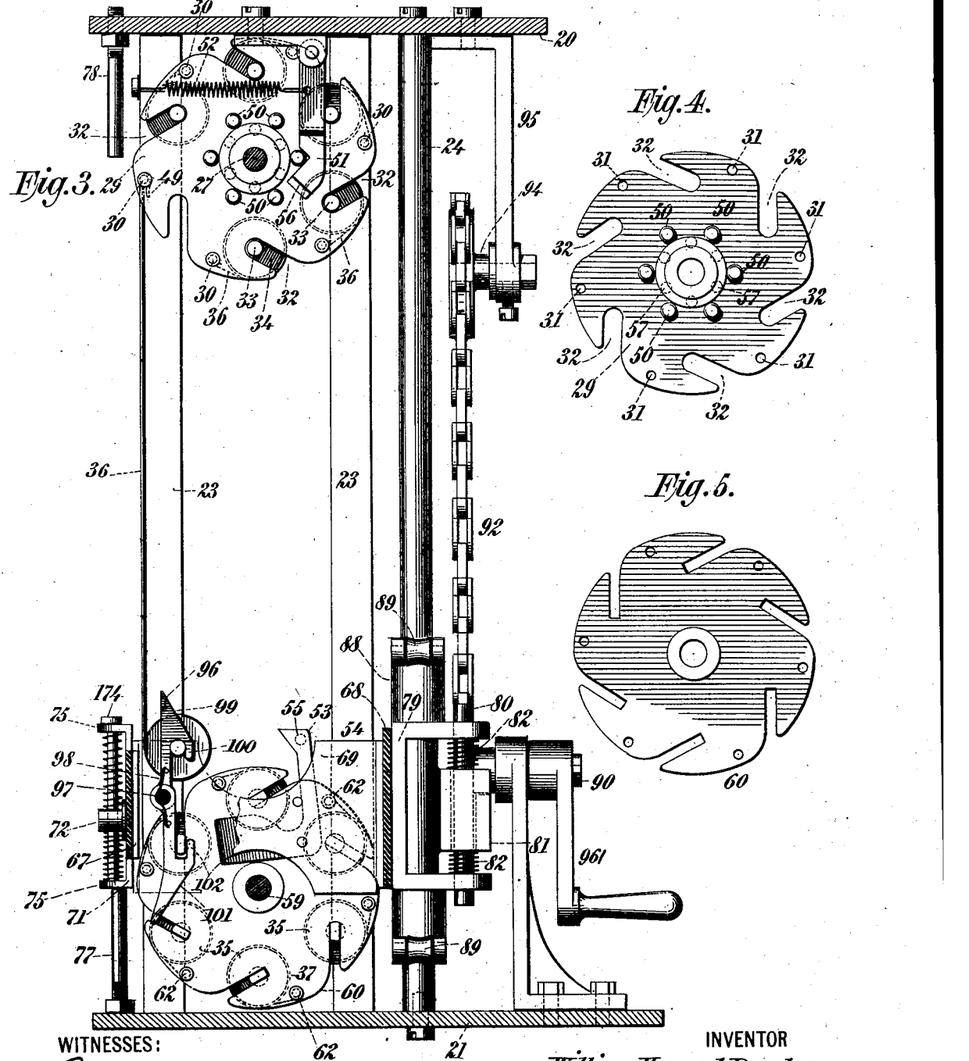
Fig. 3 is a vertical section of same on the dotted line 3 3 of Fig. 1.
Fig. 4 is an elevation looking at the right-hand side of Fig. 1 of the end disk constituting a part of the carrier for the upper group of rollers.
Fig. 5 is a like view of the end disk constituting a part of the carrier for the lower group of rollers.
Figure 12:
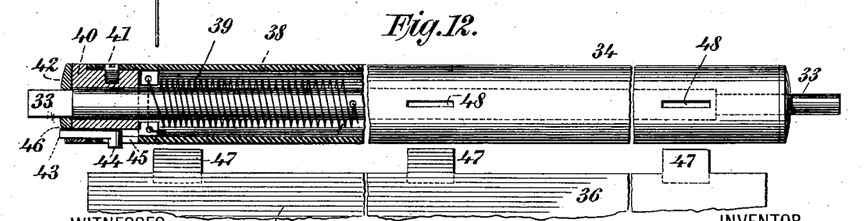
Fig. 12 is an enlarged detached side view, partly in section and partly broken away, of one of the curtain-rollers with a portion of one of the curtains ready to be applied thereto, the curtain having tongues to enter the slots in the barrel of the roller.
Figure 13:
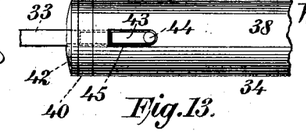
Fig. 13 is a detached elevation of the left-hand end of the curtain-roller shown in Fig. 12.

Immediately below the top plate 20 is mounted a rotary carrier for the upper group of spring curtain-rollers, said carrier comprising a shaft 27, loosely mounted in apertures in the cross-bars 25, disk-plates 28 29, secured on said shaft 27, and rods 30, which connect the disks 28 29 and with said disks form a skeleton cylindrical frame, which is adapted to carry the upper group of curtain-rollers with the curtains wound thereon. The rods 30 enter apertures 31 in the disks 28 29, which apertures are equidistant from each other, as illustrated in Fig. 4. The disks 28 29 of the upper carrier are formed with slots 32, which are open at their outer ends and are intermediate the apertures 31, and within the slots 32 are placed the ends of the shafts 33 of the spring curtain-rollers 34, as clearly illustrated in the drawings. One end of the roller-shaft 33 is round, as shown in Fig. 12, and this round end of said shaft fits within the slots 32 of the disk 29, while the other end of the shaft 33 for the upper group of curtains is flattened at its opposite sides and snugly fits within the slots of the disk 28 for the upper carrier, the flattened sides of said end of the shaft 33 engaging the side walls of the said slots in the disk 28 and preventing the unwinding of the curtain while its roller is held by the disks 28 29. The upper rollers are numbered 34 and the lower rollers 35, and the upper curtains are numbered 36, while the lower curtains are designated by the numeral 37. The rollers 34 35 correspond exactly with each other, but are reversely arranged—that is to say, that the flattened end of the shaft 33 for the upper rollers is at the left-hand side of the apparatus, as shown at the upper portion of Fig. 1, while the like ends of the shafts of the lower rollers are at the right-hand side of the apparatus, as may be observed by looking at the lower right-hand portion of Fig. 1. The spring-rollers may be of any suitable construction and in the present instance comprise a barrel 38, mounted upon the shaft 33 and inclosing a coiled spring 39, Fig. 12, one end of which is fastened to said shaft, while the other end of said spring is fastened to a hub 40, fitted in the end of the barrel 38 and adapted to be held in rigid relation to said barrel by means of a screw 41. Upon the flattened outer end of the shaft 33 is secured a disk 42, which matches against the outer end of the hub 40, and the said shaft 33 passes freely through an aperture in said hub 40 and may rotate within said hub. The hole in the disk 42, through which the end of shaft 33 passes, is rectangular. The spring 39 may be placed under tension in a very familiar way by rotating the shaft 33, the rotation of this shaft toward the right winding up the spring 39. When the curtain-rollers are in the machine or apparatus made the subject of this application, the springs 39 are always under tension, the springs being placed under tension before the rollers are introduced into the upper and lower carriers provided for them. In order that the rollers may be conveniently handled preparatory to their introduction into the machine and while the springs 39 are under tension, I provide a slidable pin 43, Fig. 13, set within a groove formed in the hub 40 and having a head 44, exposed in a slot 45, formed in the barrel 38, this pin 43 under manual manipulation being adapted to be slid outwardly, so that its outer horizontal end may enter an aperture 46 in the disk 42 for the purpose of locking the disk 42, shaft 33, and hub 40 together, whereby the said shaft 33 is prevented from turning under the action of the spring 39 and the entire roller may be conveniently handled. After the roller is introduced to the slots 32 of the disks 28 29 the pin 43 will be moved inwardly by pressure applied to its head 44, whereby the said pin will be withdrawn from the disk 42, and the spring 39 will be thereby released and left free to exert its tension against the curtain 36. The curtains 36 are preferably of muslin or other textile fabric and are detachably secured to the rollers 34, and in the present instance the curtains 36 are, as shown in Fig. 12, provided with tongues 47, to be inserted through slots 48 in the barrel 38 of the roller 34. These tongues 47 being of suitably stiff material will, when bent angularly after entering the slots 48, serve to connect the inner edge of the curtain with the barrel 38, and when the curtain 36 is given one or more turns round the barrel 38 the tongues 47 will be thereby bound in position, and the entire curtain will become detachably connected with the entire roller.

I do not limit myself to any special means for or manner of connecting the inner end of the curtain 36 with the barrel 38 of the curtain-roller, because it is evident that said end of the curtain may be secured to the barrel 38 in many ways.

Figures 9, 10, 11:
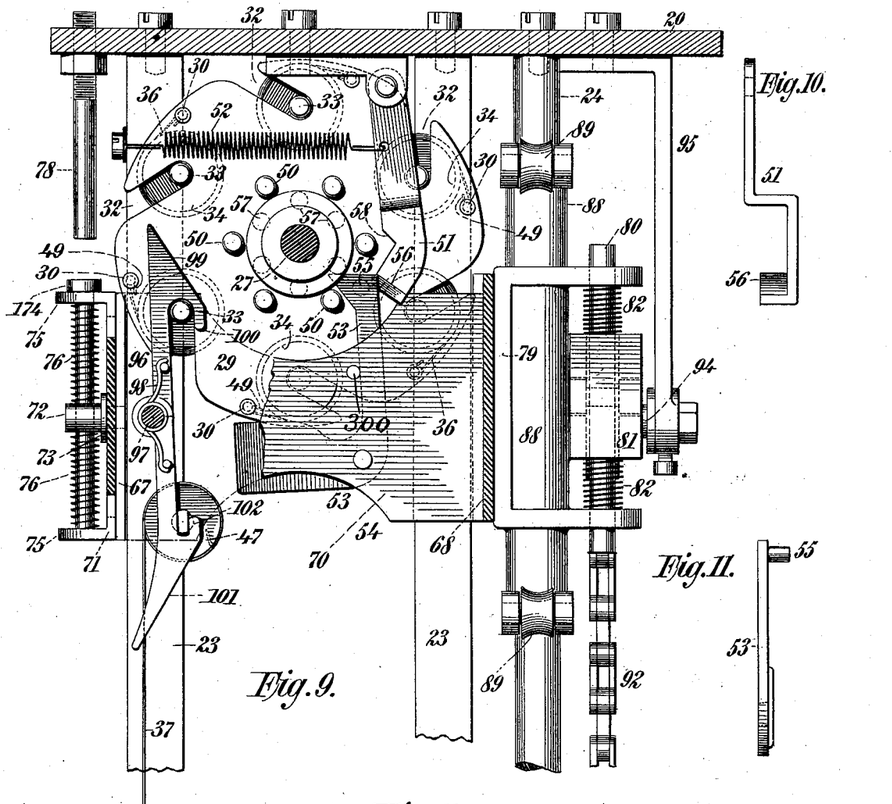
Fig. 9 is an enlarged view corresponding with the upper portion of Fig. 3, but showing the traveler as having nearly reached its upper position to deliver the curtain exposed in Fig. 1 to the upper carrier preparatory to the rotation of said carrier for positioning another curtain-roller to be taken by the traveler and drawn downwardly when said traveler again moves to its lower position.
Fig. 10 is a detached edge view of a dog shown in Fig. 9 for normally locking the upper carrier in stationary position.
Fig. 11 is a detached edge view of a weighted pawl carried by the traveler and utilized for tripping the dog shown in Fig. 10 and rotating the upper carrier to a limited extent each time the traveler arrives at its upper position.

The curtain 36 after its inner end is secured to the barrel 38 is wound upon the latter in the ordinary manner of a window-curtain, and the outer edge of the curtain 36 is provided at its center and ends with hooks 49 to hook upon the rods 30, connecting the disks of the roller-carrier, the said hooks 49 being simply cemented or otherwise applied to the outer edge of the curtain 36 and being adapted to pass upon the said rods 30, as illustrated in Fig. 9.

The curtain-rollers 34, comprising the upper group, correspond exactly with one another, and each has a curtain 36 wound upon it, and each of said rollers has its shaft 33 set within alined slots 32 of the disks 28 29, while the outer end of the curtain is held upon a rod 30 adjacent to said slots, as is illustrated in Figs. 3 and 9. Upon the application of the rollers, with the curtains wound thereupon, to the disks 28 29 the pin 43 will be withdrawn from the disk 42, so that the spring 39 may exert its force against the curtain, the tendency of the spring being to draw the curtain toward its roller and pull the outer end of the curtain against its rod 30. The tension of the spring 39 will be such that it will by its pull on the curtain hold the roller-shaft 33 within the slots 32 of the disks 28 29 until by the means hereinafter described the said shaft 33 is positively withdrawn from said slots 32 by a force superior to the tension of the spring 39. The rollers are shown in position in the slots 32 in Fig. 9, and they are there held by the tension of the springs 39 against the curtains 36. The base of said slots 32 is set inwardly beyond the line of the rods 30.

The carrier for the upper group of rollers comprises the shaft 27, disks 28 29, and rods 30, said disks having the slots 32, and in the present instance the disks 28 29 are each provided with six of the slots 32, and the said disks are connected by six of the rods 30, and when the upper carrier is thus formed it will accommodate six of the rollers 34 with their curtains 36. The disk 29 of the upper carrier is provided with a series of pins 50, to be engaged by a locking-dog 51, Figs. 3, 9, and 10, for holding the carrier at the end of each of its intermittent movements, the dog 51 being shown in its locking position in Fig. 3 and in its released position in Fig. 9. The dog 51 is firmly drawn against the pins 50 by means of a coiled spring 52, and the means for moving the dog 51 outwardly from the pins 50 is a pawl 53, carried by the traveler 54, said pawl 53 being a pivoted weighted pawl held in its upright position by a pin 300, Fig. 9, and having at its upper end a horizontally-extending pin 55 in position when the traveler 54 is reaching its upper position to move against the inclined flange 56 at the lower end of said dog 51 and push said dog at its lower end rearwardly from the pins 50. The rearward movement or tripping of the dog 51 is to enable the pawl 53 on its further upward movement to impart an intermittent rotary motion to the upper curtain-roller carrier. In Fig. 9 I illustrate the pawl 53 as having moved upwardly against the lower end of the dog 51 and pushed said dog rearwardly from the pins 50, and on reference to Fig. 9 it will be seen that the pointed upper end of the pawl 53 is in engagement with a pin 57, carried by the disk 29, and that upon the further upward movement of the traveler 54 and pawl 53 the latter, pressing against said pin 57, will turn the upper roller-carrier one-sixth in the present case of a rotation or until the pin 50, which in Fig. 9 is directly below the upper pointed end of the pawl 53, has reached a position in line with the notch 58 of the dog 51. At each upward movement of the traveler 54 the pawl 53 will disengage the dog 51 and rotate the upper carrier a definite distance sufficient to cause said carrier to position another roller to be taken and drawn downwardly by the carrier on the next descent of the latter, as will be hereinafter more fully explained. The series of pins 57 are in the form of a lantern-wheel, as may be seen on reference to Fig. 1, and they are provided to coöperate with the pawl 53 in enabling the latter to effect an intermittent rotation of the upper roller-carrier. The pins 50 are simply stop-pins to coöperate with the pivoted spring-dog 51 for holding the said carrier at the end of each of its intermittent movements.

Figure 14:
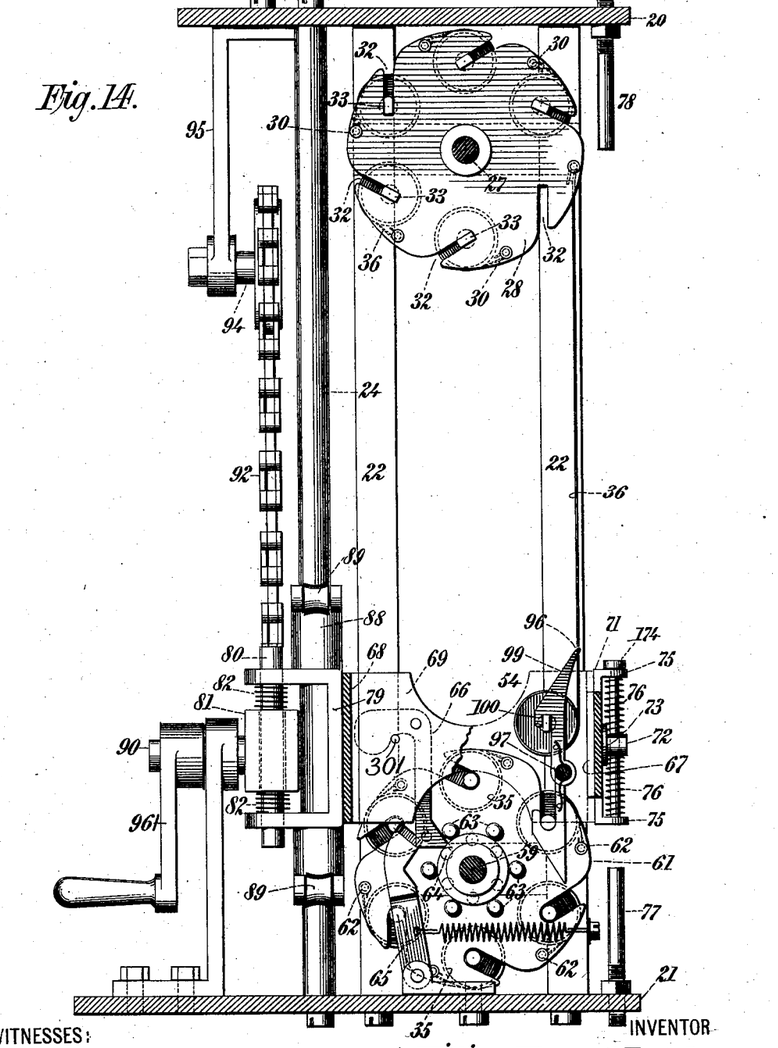
Fig. 14 is a vertical section through the apparatus on the dotted line 14 of Fig. 1.

The carrier for the lower group of curtain-rollers corresponds with the carrier for the upper group of said rollers, and the said lower carrier comprises a shaft 59, mounted in cross-bars 26 of the machine-frame, disks 60 61, secured on said shaft, and rods 62, connecting said disks, the rods 62 corresponding exactly with the rods 30 of the upper carrier, the disk 60 corresponding exactly with the disk 28 of the upper carrier, and the disk 61 corresponding exactly with the disk 29 of the upper carrier and having on its outer face, correspondingly with the disk 29 of the upper carrier, the series of stop-pins 63, and the series of pins 64 constituting a lantern-wheel for coöperation with a dog 65 and pawl 66, corresponding with the dog 51 and pawl 53 for the upper carrier, with the exception that the said parts are reversed in position, the dog 51 for the upper carrier extending downwardly from its pivot and the dog 65 extending upwardly from its pivot. The dog 65 and stop-pins 63 for the lower carrier operate exactly as the stop-pins 50 and dog 51 for the upper carrier, and the pins 64 of the lower carrier coöperate with a pawl 66, carried at the left-hand end of the traveler 54, and are identical in construction and operation with the pawl 53 for the upper carrier, with the exception that the active end of the pawl 66 hangs downwardly, while the corresponding end of the pawl 53 for the upper carrier extends upwardly. The pawl 66 is held in its upright position by a pin 301. (Shown in Fig. 14.) It seems to be unnecessary to describe in detail the action of the pins 63, pins 64, dog 65, and pawl 66 for the lower carrier, because such operation is identical with the operation of the like parts above described with respect to the upper carrier; nor do I deem it necessary to enter into a detailed description of the disks 60 61 and rods 62 of the lower carrier, because these parts are identical with the like elements of the upper carrier, with the exception that the slots of the disks 60 61 are reversely arranged to the slots 32 of the disks 28 29, as is indicated by comparison of Figs. 3 and 14, this disposition of the slots 32 being necessary because the upper carrier turns toward the front and downwardly to deliver its curtains one after another in succession to the traveler 54, while the lower carrier turns upwardly and toward the front to deliver its curtains one after another in succession to the said traveler.

The rollers 35 for the lower carrier correspond exactly with the roller illustrated in Fig. 12, and the curtains 37 for the lower group of rollers correspond exactly with the curtains 36 of the upper group, the inner ends of said curtains 37 being secured to the rollers and the outer ends of said curtains being fastened to the rods 62.

Figure 1:
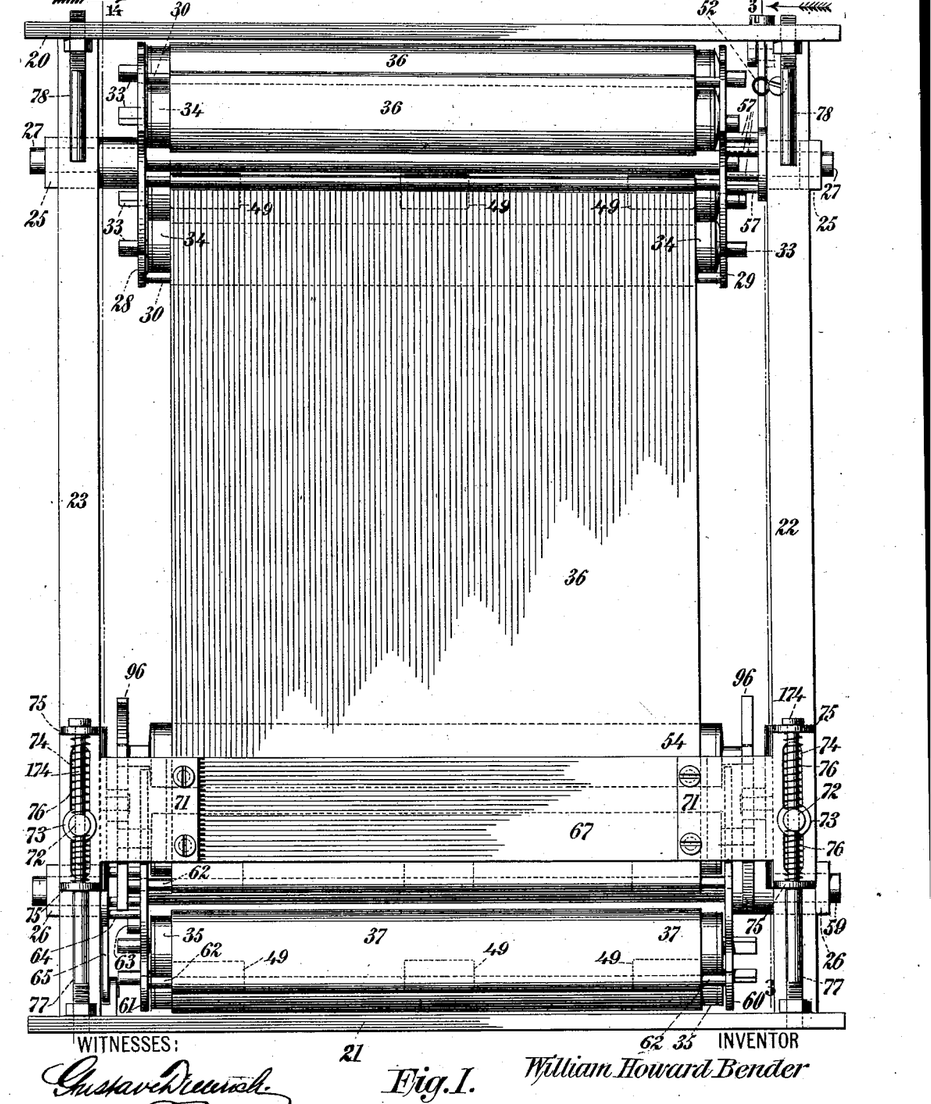
Figure 1 is a front elevation of a display apparatus constructed in accordance with and embodying the invention, the traveler which moves between the upper and lower groups of curtains being shown in its lower position with one of the upper curtains drawn downwardly to occupy the front field of the apparatus.
Figure 2:
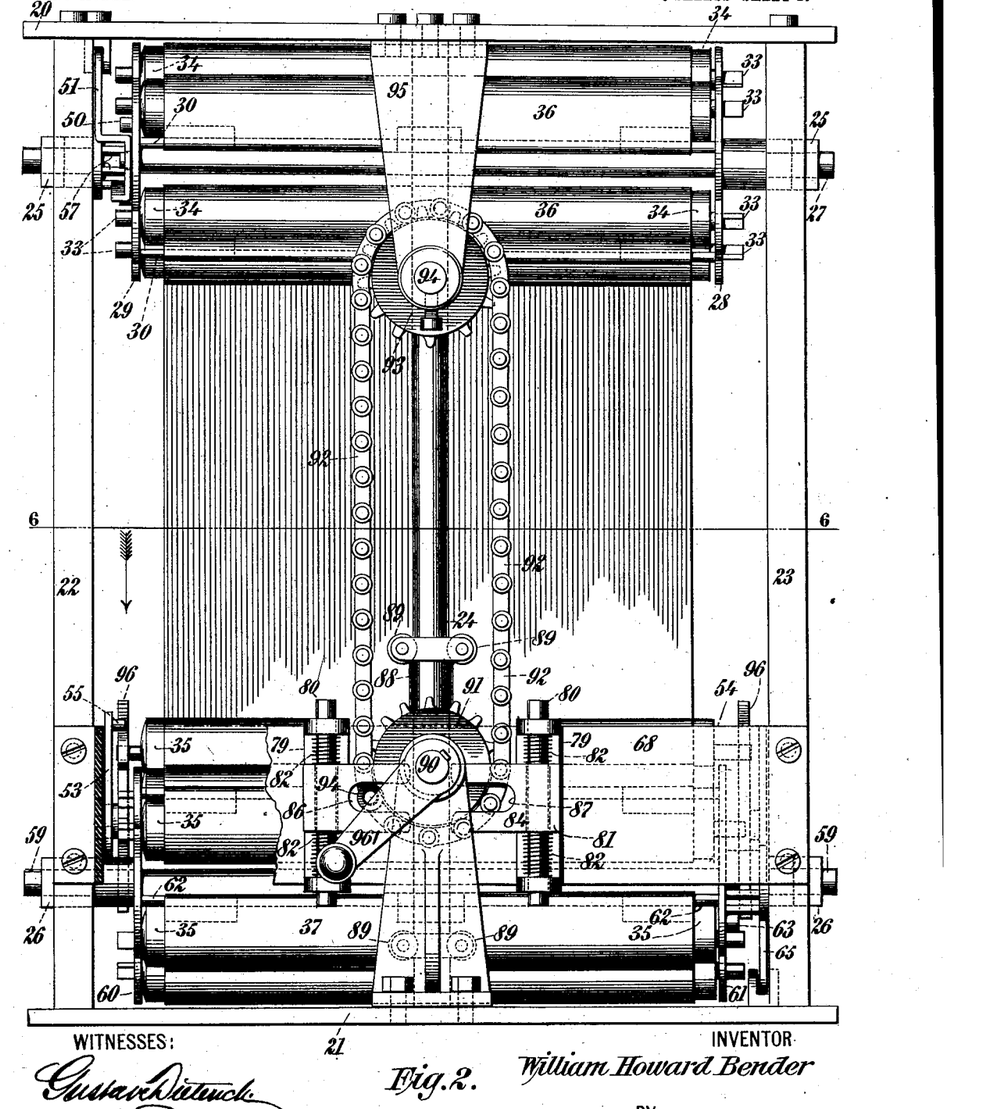
Fig. 2 is a rear elevation, partly broken away and partly in section, of same, a portion of the rear part of the traveler being broken away to more fully disclose the lower group of rollers.
Figures 6, 7, 8:
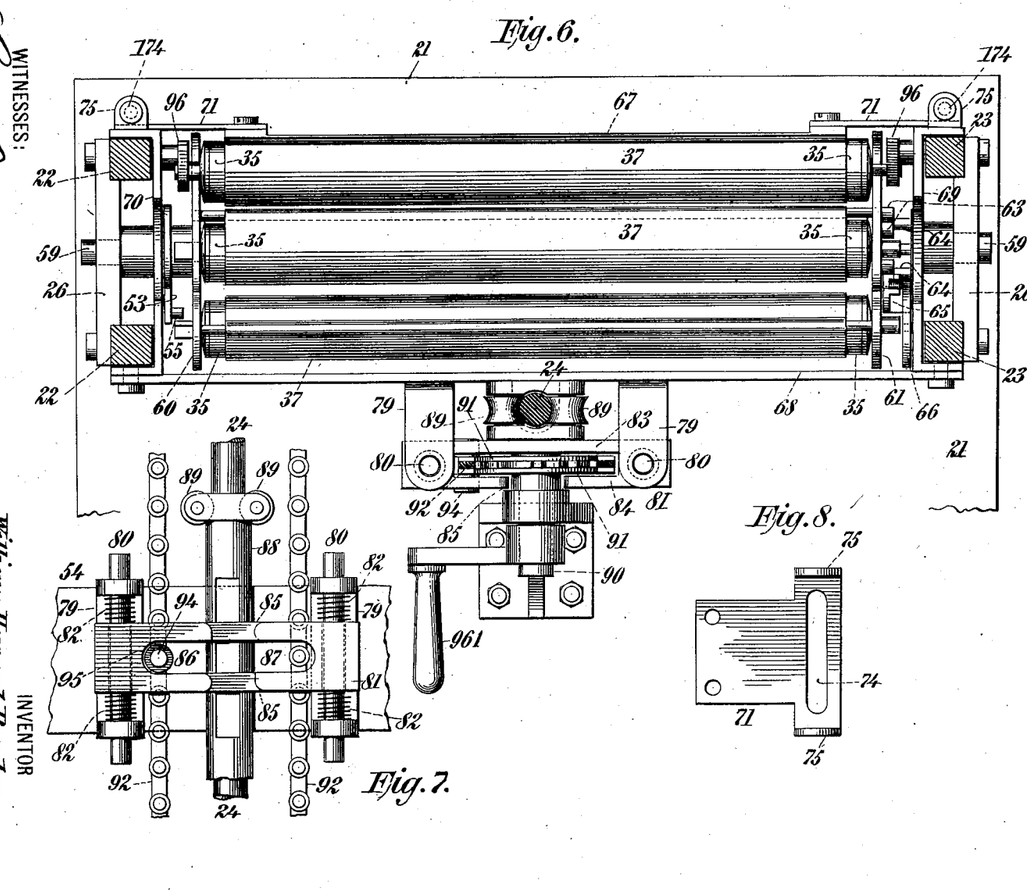
Fig. 6 is a horizontal section through the apparatus on the dotted line 6 6 of Fig. 2.
Fig. 7 is a detached view taken from the rear of the machine of a portion of the traveler and the sprocket-chain by which said traveler is given its vertical reciprocating movement intermediate the two groups of curtains.
Fig. 8 is a detached elevation of one of the end plates connected with the front part of the traveler and utilized for carrying buffers, as hereinafter explained.

The traveler 54 is moved downwardly and upwardly between the two carriers for the upper and lower groups of spring curtain-rollers, and the said traveler comprises a front horizontal bar 67, a rear horizontal bar 68, Fig. 6, and end bars 69 70, these end bars 69 70 having right-angular bent ends engaging the standards 22 23, as shown in Fig. 6, the said bars 69 70 being thus made to span the said standards 22 23 and the latter serving as guides for the traveler 54. The rear bar 68 is fastened by screws to the inner or rear ends of the bars 69 70, as shown in Figs. 2 and 6, and the front bar 67 is a plain flat bar fastened by screws at its ends to the plates 71, one of the latter being fastened to each end of the bar 67 and one of these plates being shown in detail in Fig. 8. The plates 71 are shown in front elevation in Fig. 1, and they are held upon the front ends of the bars 69 70 by means of screws 72 and washers 73, said washers lying flat against the face of said plates 71 over elongated slots 74, formed in said plates and through which the screws 73 pass. The screws 73 are rigid with the front ends of the bars 69 70, and through the heads of these screws freely pass vertical pins 174, whose ends are secured in forwardly-projecting ears 75, formed on the plates 71. Upon the pins 174, intermediate the heads of the screws 73 and ears 75, are arranged coiled springs 76. The front bar 67 is by means of the plates 71, screws 73, pins 174, and springs 76 secured to the bars 69 70 and at the same time allowed vertical yielding movement on the ends of said bars 69 70. The springs 76 operate as buffers or cushions at the ends of the line of movement of the traveler 54. At the lower end of the front of the machine or apparatus is provided the vertical stop-pins 77, and at the upper end thereof stop-pins 78 are provided, these stop-pins 77 78 being in line with each other and with the ears 75 on the plates 71. When the traveler 54 descends, the lower ears 75 will strike upon the pins 77 and the bar 67 will become arrested, while the main portion of the traveler 54 may move to a slight extent farther downward, the screws 72 at such time traveling downwardly from their intermediate position in the slots 74 and compressing the lower springs 76, said springs cushioning the bar 67. In Fig. 1 I illustrate the traveler in its lower position, with the lower ears 75 of the plate 71 arrested upon the upper ends of the pins 77. When the traveler 54 reaches its upper position, the pins 78 will arrest the bar 67, while the traveler 54 moves to a slight extent farther upward, the screws 72 at such time moving upwardly in the slots 74 and the upper springs 76 cushioning the bar 67. The bar 67 is arranged to pass very closely to the upper and lower carrier-disks when at the ends of its line of movement, as may be understood on reference to Fig. 3, and hence it is desirable to arrest said bar slightly before the traveler 54 completes its movement, so that said bar may not interfere with the proper operation of said carrier-disks, and it is for this reason that I provide the stop-pins 77 78, plates 71, pins 174, and springs 76 for arresting and cushioning the bar 67.

The rear bar 68 of the traveler 54 is provided with brackets 79, carrying vertical pins 80, upon which is arranged a frame 81 and coiled springs 82, these springs being arranged one above and one below each end of the frame 81 for cushioning said frame, the latter being allowed a limited yielding movement upon the pins 80. The frame 81 comprises a front bar 83 and a rear bar 84, the latter having vertical openings 85, and transverse slots 86 87, as more fully illustrated in Figs. 6 and 7, and the frame 81 is directly back of the sleeve 88, mounted upon the vertical standard 24, the latter serving as a guide for said sleeve 88 during the vertical movement of the traveler 54. The sleeve 88 is fastened to and moves with the bar 68 of the traveler 54, and at its upper and lower ends the said sleeve 88 is equipped with grooved rollers 89, which guide upon the aforesaid standard 24. The traveler 54 receives its movement from a driving-shaft 90, sprocket-wheel 91, secured on said shaft, the sprocket-chain 92, engaging said wheel 91, and a sprocket-wheel 93, also engaged by said chain 92, the said chain 92 carrying a pin 94, preferably having thereon a roller 95 in engagement with the frame 81. When the shaft 90 is in motion, it will, through its sprocket-wheel 91, impart the usual movement to the sprocket-chain 92, and said chain will, through its pin 94, impart motion to the traveler 54 by reason of the engagement of said pin with the frame 81. When the traveler 54 is moving upwardly, the pin 94 and roller 95 will be in the slot 86 of the frame 81 and, pressing against the upper wall of said slot, will cause said frame 81 and traveler 54 to move upwardly. When the traveler reaches its upper position, the slot 85 of the frame 81 will pass upon opposite sides of the shaft 94 of the sprocket-wheel 93, and thus allow the slots 86 87 of the frame 81 to reach the upper edge of said wheel, this being for the purpose of enabling the pin 94 and roller 95 to pass from the slot 86 of said frame 81 and enter the slot 87 of said frame, so that as the said pin and roller is moving downwardly on the descending side of the sprocket-chain 92 they may by pressing against the lower wall of the slot 87 cause the traveler 54 to descend with it. When the traveler reaches the lower end of its movement, the slot 85 of the frame 81 will pass over the driving-shaft 90 in the rear of the sprocket-wheel 91, and thus as the chain 92 continues its movement the pin 94 and roller 95 may pass from the slot 87 back into the slot 86 of the frame 81 and then, when ascending effect the upward movement of the traveler 54. The traveler 54 is thus moved both upwardly and downwardly by means of the pin 94 and roller 95, carried by the chain 92, said roller and pin being in the slot 86 of the frame 81 during the upward movement of the traveler and in the slot 87 of said frame during the downward movement of the traveler. When the frame 81 is at its upward position, it receives between its front bar 83 and rear bar 84 the upper sprocket-wheel 93, and when the frame 81 is in its lower position it receives between its said bar 84 and bar 83 the lower sprocket-wheel 91, as shown in Fig. 2. The shaft 94 for the upper sprocket-wheel 93 is held in the lower end of a hanger 95. The frame 81 is cushioned by the springs 82, so as to be slightly yielding, thus preventing the pin 94 and roller 95 from binding against the walls of the slots 86 87 when leaving one slot and entering the other slot. Power may be applied to the driving-shaft 90 in any approved way and by any approved means, the power mechanism for driving the shaft 90 constituting no part of the present invention. In the present instance I illustrate the shaft 90 as being equipped with a crank 961, by means of which said shaft will be rotated to effect the movement of the sprocket-chain 92 and traveler 54.

The traveler 54 carries the weighted pawls 53 and 66, hereinbefore described, the pawl 53 being pivotally secured to the bar 70 of the traveler 54 and the pawl 66 being pivotally secured to the bar 69 of said traveler. The traveler 54 also carries at its opposite ends pivoted clutch-bars 96, these bars 96 being mounted upon pins 97, extending toward each other from the bars 69 70 of the traveler 54. The pins 97 have wound upon them coiled springs 98, whose ends, as shown in Fig. 3, bear against the bars 96 at the opposite sides of the pivot-points of the latter, said springs exerting their force to keep the bars 96 perpendicular, but yielding when one end or the other of said bars is pressed outwardly. The bars 96 are provided at their upper ends with inclined surfaces 99, leading downwardly to clutch-hooks 100, and the said bars at their lower ends are provided with inclined surfaces 101, leading upwardly to clutch-hooks 102, the purpose of the clutch-bars 96 being to engage the shafts 33 of the curtain-rollers presented to them when the traveler is reaching the ends of its line of movement. The shape of the interior walls of the clutch-hooks 100 and 102 conforms to the shape of the ends of the shafts 33 of the curtain-rollers.

The upper end of the left-hand bar 96 and the lower end of the right-hand bar 96 are bent frontwardly, so that the extremities of said ends may not when the traveler is reaching the ends of its line of travel strike against the rectangular ends of the curtain-rollers then in their path.

When the traveler 54 is reaching its upper position, the pawl 53 will, as hereinbefore described, trip the dog 51 in the manner shown in Fig. 9, and the pointed end of said pawl will upon completing its upward movement effect a partial rotation of the upper carrier for the curtain-rollers, this having the effect of moving the shaft of the roller immediately above the clutch-bars 96 downwardly against the inclined surfaces 99 of said bars and tilting said bars outwardly at their upper ends, so that said shaft may pass below the hooks 100 of said bars, whereupon, the ends of the said shaft having left the bars 96, the upper ends of the latter will under the influence of the springs 98 return to their initial position and said hooks 100 will be directly over the ends of said shaft, and thereupon the traveler 54 will move downwardly, with two results, one being to carry the pawl 53 from the dog 51 and allow said dog to engage one of the pins 50 and lock the upper curtain-roller carrier in firm position and the second being that as the traveler 54 moves downwardly the hooks 100 of the clutch-bars 96 will pass upon and engage the shaft of the curtain-roller which passed below them and draw said shaft and roller from their slots 32, as shown in Fig. 3, the continued downward movement of the traveler 54 causing the curtain to unwind from its roller and extend across the front field of the apparatus, so that the matter thereon may be fully displayed. When the traveler 54 moves downwardly from its upper position, the pin 55 of the pawl 53 will descend upon and ride down the upper surface of the flange 56 of the dog 51 and finally pass off from said flange, said pawl at its upper end tilting rearwardly, due to the inclination of the flange 56, to permit said pin to pass said flange. When the traveler 54 reaches the lower end of its line of movement, the pawl 66 will trip the lower dog 65 to free the lower curtain-roller carrier and then turn said carrier to a limited extent for the purpose of causing the ends of the shaft of the curtain-roller next below the clutch-bars 96 to move upwardly along the inclined surfaces 101 and tilt the lower ends of said bars outwardly, so that said shaft may pass above the hooks 102 of said bars, so that upon the succeeding ascent of the traveler 54 the said hooks 102 may pass upon and carry the said shaft, with its roller, from the slots of the lower carrier-disks and unroll the curtain from said roller upwardly, as represented in Fig. 9, for the purpose of displaying the advertising or other matter upon said curtain. The traveler 54 upon its descent thus carries downwardly one of the rollers from the upper carrier, and upon its succeeding ascent carries upwardly one of the rollers from the lower carrier, and upon the ascent of the traveler 54 the display-curtain of the upper group gradually becomes rolled up upon its roller under the action of the interior spring 39. When the traveler reaches its upper position, it moves the ends of the shaft of the roller into the slots waiting to receive them of the upper carrier-disks 28 29, as shown in Fig. 9, and then upon the rotation of the upper carrier-disks by means of the pawl 53 the shaft of this roller, which has just been returned to said disks, moves downwardly from the upper hooks 100 during the period that the shaft of the roller next above the clutch-bars 96 is turning downwardly to pass into position to be taken by said hooks 100 upon the next descent of the traveler 54. When the traveler 54 reaches its lower position, the hooks 102 will deliver the shaft of the roller previously carried upwardly by them into the slots of the lower carrier-disks 60 61 to the position shown in Fig. 3, and then upon the lower pawl 66 imparting movement to the said disks the said shaft will be carried upwardly from the said hooks 102 and the shaft of the roller next below the clutch-bars 96 will be moved upwardly into position to be taken by said hooks 102 upon the next ascent of the traveler 54. Thus the traveler 54 moves intermediate of the two groups of curtain-rollers, and upon each descent of said traveler the clutch-bars 96 will draw downwardly one of the rollers of the upper group and cause the curtain thereon to become unwound, and at the same time the said clutch-bars will deliver to the lower carrier the roller of that group which had been previously displayed, and upon each ascent of said traveler 54 it will carry upwardly a roller of one of the lower groups of curtains and unwind the curtain therefrom, while at the same time the displayed curtain of the upper group will be returned to its carrier. The traveler 54 therefore always when in movement carries a curtain of the upper group and a curtain of the lower group, unwinding and displaying one of the said curtains and allowing the rewinding of the other curtain preparatory to its delivery to its carrier. When the traveler 54 is descending, the curtain of the upper group is being unwound for display and a curtain of the lower group is being wound up for delivery to its carrier, and when the said traveler is ascending a curtain of the lower group is being unwound for display, while a curtain of the upper group is being wound upon its roller for delivery to its carrier.

In the present instance I illustrate each of the carriers as being equipped with six of the spring-rollers with curtains thereon; but it is obvious that the said carriers may, according to their size, be equipped with any number of curtains desired. The purpose of the invention is to provide the upper and lower carriers with groups of curtains, so that said curtains may one after another in succession be delivered to the clutch-bars 96 and unrolled by them, the carriers automatically supplying the clutch-bars 96 with the curtains in succession and said clutch-bars restoring to the carriers the displayed curtains in succession.

The shaft 90 may be arrested when the traveler 54 is at the respective ends of its line of movement, so as to display the curtain then across the front field of the apparatus as long as may be desired; but ordinarily the shaft 90 will be arrested at each end of the line of travel of the traveler 54 only for the fraction of a minute, and thus there will be substantially a continuous display of the curtains, the latter in succession being drawn across the front field of the apparatus.

The front bar of the traveler 54 substantially conceals from view the two curtain-rollers carried by said traveler.

In the foregoing description I have mentioned that the outer ends of the display-curtains are provided with hooks to engage the rods of the roller-carriers; but I desire it to be understood that the invention is not limited to any special method of or means for securing the outer end of the curtains to said carriers.

The details of the apparatus hereinbefore described may be modified in many respects without departing from the scope of my invention as claimed; and I do not, therefore, limit my invention to such details further than as may be indicated in the following claims.

What I claim as my invention, and desire to secure by Letters Patent, is—

1. A display apparatus comprising the general supporting-frame, a group of spring-rollers with curtains thereon at opposite ends of said frame, and carriers for said rollers, said curtains being held at one end by said rollers and at the other end by said carriers, combined with a traveler adapted to be moved intermediate said groups of rollers, means carried by said traveler for automatically engaging the shaft of a roller of one of said groups when said traveler is at one end of its path for withdrawing said roller and thereby unwinding the curtain therefrom when said traveler recedes from said group, means carried by said traveler for automatically engaging the shaft of a roller of the other of said groups when said traveler is at the other end of its path for withdrawing said roller and thereby unwinding the curtain therefrom when said traveler recedes from said group, and means for actuating said carriers to successively position said curtains to be taken one after another by the traveler mechanism when the traveler reaches the ends of its path; substantially as set forth.

2. A display apparatus comprising the general supporting-frame, a group of spring-rollers with curtains thereon at opposite ends of said frame, and carriers for said rollers, said curtains being held at one end by said rollers and at the other end by said carriers, combined with a traveler adapted to be moved intermediate said groups of rollers, means carried by said traveler for automatically engaging the shaft of a roller of one of said groups when said traveler is at one end of its path for withdrawing said roller and thereby unwinding the curtain therefrom when said traveler recedes from said group, means carried by said traveler for automatically engaging the shaft of a roller of the other of said groups when said traveler is at the other end of its path for withdrawing said roller and thereby unwinding the curtain therefrom when said traveler recedes from said group, means for actuating said carriers to successively position said curtains to be taken one after another by the traveler mechanism when the traveler reaches the ends of its path, a driving-shaft provided with means whereby it may be driven, the continuous sprocket-chain connected with said shaft and carrying a pin, and the frame carried by said traveler and having the slots for the engagement and movement of said pin, whereby the rotary motion of said shaft is caused to impart a reciprocating movement to said traveler; said traveler comprising a front bar extending across the apparatus in position to conceal the spring curtain-rollers carried by it, substantially as set forth.

3. A display apparatus comprising the general supporting-frame, a group of spring-rollers with curtains thereon at the end of said frame, and a carrier for said rollers, said curtains being held at one end by said rollers and at the other end by said carrier, combined with a traveler adapted to be moved toward and from said group, means carried by said traveler for automatically engaging the shaft of one roller of said group when said traveler is at one end of its path for withdrawing said roller and thereby unwinding the curtain therefrom when said traveler recedes from said group, and means for actuating said carrier to successively position said rollers to be taken one after another by the traveler mechanism when said traveler reaches said group;

said traveler comprising a front bar extending across the apparatus in position to conceal the spring curtain-roller carried by it, substantially as set forth.

4. A display apparatus comprising the general supporting-frame, a group of spring-rollers with curtains thereon at the end of said frame, and a carrier for said rollers, said curtains being held at one end by said rollers and at the other end by said carrier, combined with a traveler adapted to be moved toward and from said group, means carried by said traveler for automatically engaging the shaft of one roller of said group when said traveler is at one end of its path for withdrawing said roller and thereby unwinding the curtain therefrom when said traveler recedes from said group, means for actuating said carrier to successively position said rollers to be taken one after another by the traveler mechanism when said traveler reaches said group, a driving-shaft provided with means whereby it may be driven, the continuous sprocket-chain connected with said shaft and carrying a pin, and the frame carried by said traveler and having the slots for the engagement and movement of said pin, whereby the rotary motion of said shaft is caused to impart a reciprocating movement to said traveler; substantially as set forth.

5. A display apparatus comprising a general supporting-frame, a rotary roller-carrier at the end thereof and comprising the shaft and slotted disks thereon, and the group of spring-rollers with display-curtains thereon removably mounted in the slots of said disks, the outer ends of said curtains being secured to said carrier adjacent to the slots holding the said rollers, combined with a traveler adapted to be moved toward and from said group, means carried by said traveler for automatically engaging the shaft of one roller of said group when said traveler is at one end of its path for withdrawing said roller and thereby unwinding the curtain therefrom when said traveler recedes from said group, and means for actuating said carrier to successively position said rollers to be taken one after another by the traveler mechanism when said traveler reaches said group; said traveler comprising a front bar extending across the apparatus in position to conceal the spring curtain-roller carried by it, substantially as set forth.

6. A display apparatus comprising a general supporting-frame, a rotary roller-carrier at the end thereof and comprising the shaft, the slotted disks thereon and the series of rods extending from one to the other of said disks adjacent to the slots therein, and the group of spring-rollers with display-curtains thereon removably mounted in the slots of said disks, the outer ends of said curtains being secured on said rods, combined with a traveler adapted to be moved toward and from said group, means carried by said traveler for automatically engaging the shaft of one roller of said group when said traveler is at one end of its path for withdrawing said roller and thereby unwinding the curtain therefrom when said traveler recedes from said group, and means for actuating said carrier to successively position said rollers to be taken one after another by the traveler mechanism when said traveler reaches said group; said traveler comprising a front bar extending across the apparatus in position to conceal the spring curtain-roller carried by it, substantially as set forth.

7. A display apparatus comprising a general supporting-frame, a rotary roller-carrier at the end thereof and comprising the shaft and slotted disks thereon, and the group of spring-rollers with display-curtains thereon removably mounted in the slots of said disks, the outer ends of said curtains being secured to said carrier adjacent to the slots holding the said rollers, combined with a traveler adapted to be moved toward and from said group, clutch-hooks carried by said traveler for automatically engaging the shaft of one roller of said group for withdrawing said roller and thereby unwinding the curtain therefrom when said traveler recedes from said group, and the pawl carried by said traveler for engaging said carrier and effecting an intermittent rotation of the same to position said rollers for said clutch-hooks; substantially as set forth.

8. A display apparatus comprising a general supporting-frame, a rotary roller-carrier at the end thereof and comprising the shaft and slotted disks thereon, and the group of spring-rollers with display-curtains thereon removably mounted in the slots of said disks, the outer ends of said curtains being secured to said carrier adjacent to the slots holding the said rollers, combined with a traveler adapted to be moved toward and from said group, clutch-hooks carried by said traveler for automatically engaging the shaft of one roller of said group for withdrawing said roller and thereby unwinding the curtain therefrom when said traveler recedes from said group, a spring-dog for holding said carrier at the end of each of its movements, and a pawl carried by said traveler in position to, when the traveler is reaching the said group, trip said dog and rotate said carrier to move another of said rollers into position for said hooks; substantially as set forth.

9. A display apparatus comprising a general supporting-frame, rotary roller-carriers at the ends thereof and each comprising the shaft and slotted disks thereon, and the groups of spring-rollers with display-curtains thereon removably mounted in the slots of said disks, the outer ends of said curtains being secured to said carriers adjacent to the slots holding the rollers, combined with a traveler adapted to be moved intermediate said groups of rollers, means carried by said traveler for automatically engaging the shaft of a roller of one of said groups when said traveler is at one end of its path for withdrawing said roller and thereby unwinding the curtain therefrom when said traveler recedes from said group, means carried by said traveler for automatically engaging the shaft of a roller of the other of said groups when said traveler is at the other end of its path for withdrawing said roller and thereby unwinding the curtain therefrom when said traveler recedes from said group, and means for actuating said carriers to successively position said curtains to be taken one after another by the traveler mechanism when the traveler reaches the ends of its path; said traveler comprising a front bar extending across the apparatus in position to conceal the spring curtain-rollers carried by it, substantially as set forth.

10. A display apparatus comprising a general supporting-frame, rotary roller-carriers at the ends thereof and each comprising the shaft and slotted disks thereon, and the groups of spring-rollers with display-curtains thereon removably mounted in the slots of said disks, the outer ends of said curtains being secured to said carriers adjacent to the slots holding the rollers, combined with a traveler adapted to be moved intermediate said groups of rollers, clutch-hooks carried by said traveler for automatically engaging the shaft of a roller of one of said groups when said traveler is at one end of its path for withdrawing said roller and thereby unwinding the curtain therefrom when said traveler recedes from said group, clutch-hooks carried by said traveler for automatically engaging the shaft of a roller of the other of said groups when said traveler is at the other end of its path for withdrawing said roller and thereby unwinding the curtain therefrom when said traveler recedes from said group, and pawls carried by said traveler for engaging and rotating said carriers to position said rollers for said hooks; substantially as set forth.

11. A display apparatus comprising a general supporting-frame, rotary roller-carriers at the ends thereof and each comprising the shaft and slotted disks thereon, and the groups of spring-rollers with display-curtains thereon removably mounted in the slots of said disks, the outer end of said curtains being secured to said carriers adjacent to the slots holding the rollers, combined with a traveler adapted to be moved intermediate said groups of rollers, clutch-hooks carried by said traveler for automatically engaging the shaft of a roller of one of said groups when said traveler is at one end of its path for withdrawing said roller and thereby unwinding the curtain therefrom when said traveler recedes from said group, clutch-hooks carried by said traveler for automatically engaging the shaft of a roller of the other of said groups when said traveler is at the other end of its path for withdrawing said roller and thereby unwinding the curtain therefrom when said traveler recedes from said group, dogs for holding said carriers at the end of each of their movements, and pawls carried by said traveler in position to, when the traveler is reaching the ends of its path, trip said dogs and rotate said carriers to position the rollers in succession for said hooks; substantially as set forth.

12. A display apparatus comprising a general supporting-frame, and a traveler adapted to be moved intermediate the ends of said frame, combined with a spring-roller with a display-curtain thereon carried by said traveler, means rigidly securing the outer end of said curtain at one end of said frame, a second spring-roller with a display-curtain thereon carried by said traveler, and means for rigidly securing the outer end of this second curtain at the other end of said frame, whereby said traveler while in motion is adapted to effect the unrolling of one of said curtains and permit the winding up of the other curtain upon its roller, said traveler comprising a front bar extending across the apparatus in front of the two spring-rollers carried by the traveler; substantially as set forth.

Signed at New York, in the county of New York and State of New York, this 10th day of August, A. D. 1903.

WILLIAM HOWARD BENDER.

Witnesses:
   CHAS. C. GILL,
   ARTHUR MARION.